United States Patent [19]

Chaplin et al.

[11] 4,409,274

[45] Oct. 11, 1983

[54] COMPOSITE MATERIAL

[75] Inventors: Christopher R. Chaplin, Reading; James E. Gordon, Oxfordshire; Giorgio Jeronimidis, Reading, all of England

[73] Assignee: Westvaco Corporation, New York, N.Y.

[21] Appl. No.: 351,777

[22] Filed: Feb. 24, 1982

[51] Int. Cl.³ .................. B32B 3/28; B32B 5/08; B32B 5/22

[52] U.S. Cl. .................. 428/112; 156/210; 428/105; 428/113; 428/182; 428/184; 428/186

[58] Field of Search .............. 428/182, 184, 186, 105, 428/112, 113; 156/210; 264/286; 229/6 R

[56] References Cited

U.S. PATENT DOCUMENTS

| | | | |
|---|---|---|---|
| 2,960,146 | 11/1960 | Williams | 154/32 |
| 3,071,180 | 1/1963 | Finger et al. | 264/286 |
| 3,146,155 | 8/1964 | Trenner | 161/139 |
| 3,404,748 | 10/1968 | Bjorksten | 428/105 |
| 3,431,162 | 3/1969 | Morris | 428/182 |
| 4,204,016 | 5/1980 | Chavannes | 428/186 |
| 4,232,074 | 11/1980 | Chavannes | 428/110 |
| 4,265,981 | 5/1981 | Campbell | 428/591 |

FOREIGN PATENT DOCUMENTS 1331431 9/1973 United Kingdom .
1333711 10/1973 United Kingdom .

OTHER PUBLICATIONS

J. E. Gordon and G. Jeronimidis, *Composites With High Work of Fracture,* Phil. Trans. R. Soc. Lond. A 294, 545–550, (1980).

Primary Examiner—Paul J. Thibodeau
Attorney, Agent, or Firm—W. Allen Marcontell; Richard L. Schmalz

[57] ABSTRACT

A composite structural panel of high strength and toughness is relatively inexpensively formed with state-of-the-art corrugated paperboard equipment and technology by bonding structural reinforcing fiber to a corrugated medium at an approximately 15° orientation angle relative to the medium flute axes.

17 Claims, 6 Drawing Figures

U.S. Patent    Oct. 11, 1983    4,409,274
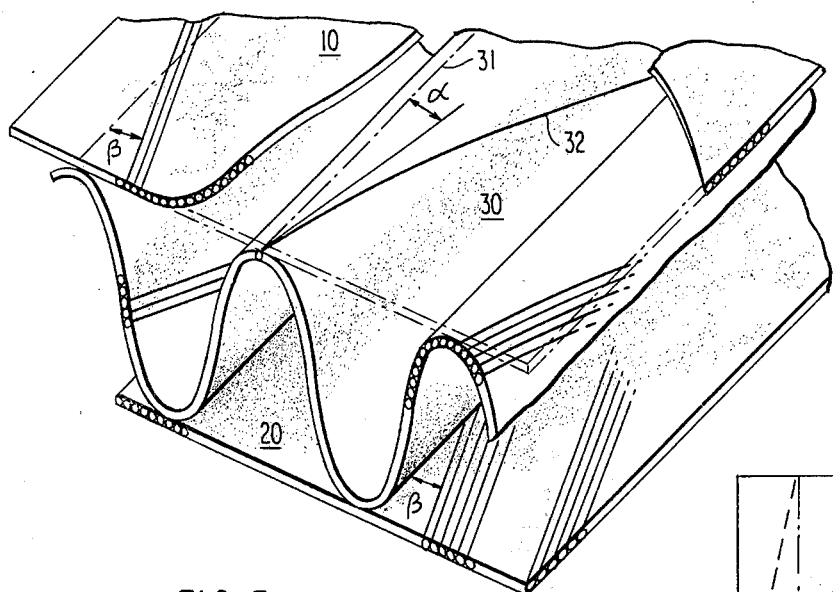
FIG.1
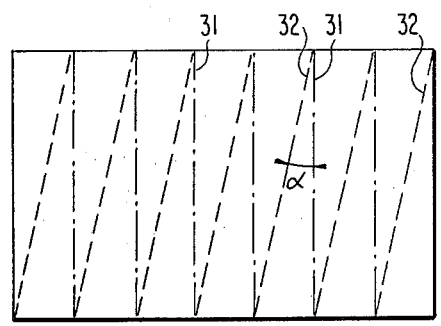
FIG.2
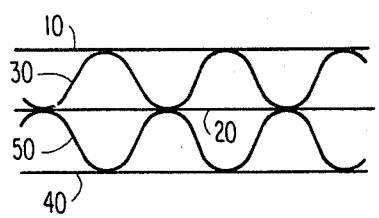
FIG.3
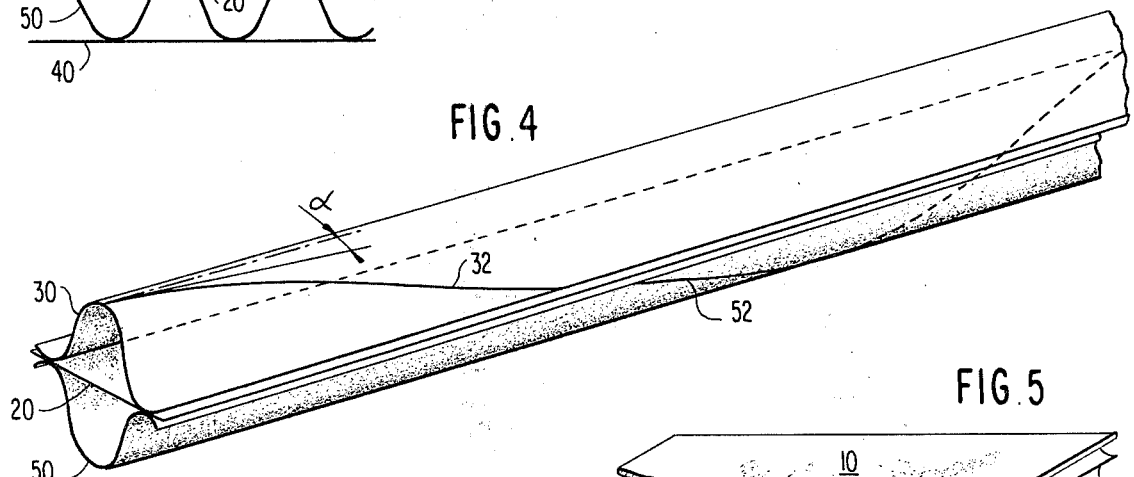
FIG.4
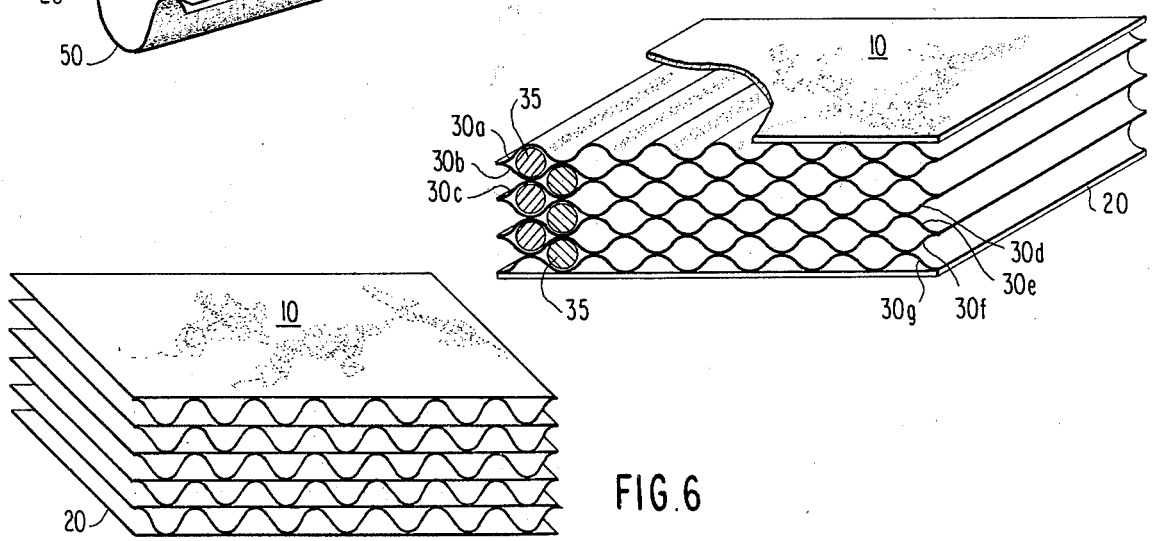
FIG.5
FIG.6

COMPOSITE MATERIAL

BACKGROUND OF THE INVENTION

1. Field of the Invention

The present invention relates to the art of man-made fiber reinforced materials. In addition, the invention relates to methods of fiber arrangement and composite assembly.

2. Description of the Prior Art

Wood is a naturally occurring composite material formed of hollow tubular cells bound together by lignin, the cell walls being formed by helically oriented cellulose fibers.

Plywood is a partially man-made material in which the natural orientation of wood is varied by specified laminate thicknesses and grain orientation to enhance or develop desired sheet properties.

Over the past twenty-five years, the industrial capacity to form extremely thin, flexible and remarkably strong fibers from glass, carbon and other materials has given rise to new and entirely man-made composites of glass (carbon, etc.) fibers in oriented laminates, woven into a cloth or laid in a randomly oriented mat in which the intersticies between the fibers are saturated with a thermoplastic or thermosetting polymer in the viscous liquid state which is thereafter thermally or chemically cured to the solid state. Rigid structural materials and articles fabricated in this manner have been generically termed "fiber reinforced plastic (FRP) composites."

In the past, engineers and designers have been chiefly concerned with the limits of breaking stress of a material, that is to say, determinations of the force required to produce a given area of fracture surface as measured in pounds per square inch (p.s.i.) or Newtons per square meter ($N/m^2$).

More recently, it has been found more fruitful to consider not only the force but the energy required to produce a fracture-surface. This energy per unit area term is called the work-to-fracture value of a material and has been found to give a better indication of the performance of a material under actual load conditions than does the breaking stress alone. It is usually the best way of predicting damage tolerance.

"Work-to-fracture" or "work-of-fracture" is analagous to several other expressions of the effective toughness of a material, such as "fracture toughness" or "critical stress intensity."

Various tests are used to determine work-to-fracture. For FRP laminates, the work, which derives mostly from delamination and the mechanism of fiber pull-out, can be measured by pulling a sample apart in a tensile tester. For other, tougher, materials, the work-to-fracture is traditionally assessed by "charpy" or "Izod" tests which involve swinging a heavy pendulum so as to fracture a short beam of the material that has been notched on the tension side. The ratio (a) of work (foot-lbs. or Joules) required to fracture the notched composite short beam in the Charpy/Izod tests to (b) cross sectional area (square inches or square meters) in the exposed crack surface is computed as the material's work-to-fracture.

Typical work-to-fracture values for some common materials include: unreinforced paper at $5 \times 10^2$ $J/m^2$ which indicates the material tears readily, wood at $10^4$ $J/m^2$ which is an acceptable work-to-fracture value provided working stresses are moderate, and ductile aluminum and steel at $10^5-10^6$ $J/m^2$ which is an excellent level of work-to-fracture, indicative of a high degree of damage tolerance.

Although many thermoplastics like nylon have work-to-fracture values which are high enough for use in non-critical applications, their stiffness is unavoidably inadequate for large panels. Conventional solid, FRP composites such as fiberglass, which are stiffer, have a marginally acceptable work-to-fracture value of $10^3-10^4$ $J/m^2$. This, however, is considered inadequate for many load-bearing applications which are subject to impact. A fundamental problem is that the work-to-fracture of conventional FRP composites is such as renders structures vulnerable to catastrophic failure.

It is important to recognize that while a great deal of effort has been expended in the development of FRP composites which have high stiffness and strength, until recently comparatively little research has been done in an attempt to make such materials sufficiently tough or damage-tolerant to compete with the ductile metals whose superior ability to deform and absorb energy without cracking under stress makes them "safe" for many structural applications.

In developing lighter structures, designers are constantly seeking materials to operate at even high stresses while at the same time there is a need for higher specific stiffness to resist buckling under the action of compressive stresses. In the development of high strength steels it has long been recognized that, in general, high strength can only be achieved at the expense of ductility and as a consequence, toughness. Lower work-to-fracture coupled with higher working stresses means that such materials must be used only in components not subject to heavy impact and where the size of defects can be reliably controlled. Fiber composites exploit the potential high strength of essentially brittle materials. Furthermore, those relatively few materials of high specific stiffness (boron, carbon, silicon carbide, etc.) are by their nature essentially brittle, behaving elastically to the point of failure, and can only be utilized in fibrous form. The reason for this is that in the fiber reinforced composite the naturally occurring defects in individual fibers, though leading to premature failure of that fiber, will not precipitate catastrophic failure of the composite as a whole. This is due to the comparatively low strength of the matrix material and the fiber matrix interface. This mechanism renders fiber composites sufficiently insensitive to microscopic defects for very high strengths to be developed. However, in their conventional forms, the work-to-fracture is inadequate for those applications which require a high degree of damage tolerance.

Bending stiffness may be defined as the product of (1) the Young's modulus of the material (E) and (2) the second moment of area (I) function of the structure geometry. For a given structural member and functional task, it is the engineer's art to coordinate the structural geometry (I) with an appropriate material selection (E) to achieve the stiffness required. Normally, however, material selections are dictated or at least restricted by cost or environmental concerns thereby leaving the engineer with only the geometry of the member as a variable parameter. But when stiffness is achieved by geometric design, weight of the resulting member is directly related. In vehicular applications such as airplanes, automobiles and vessels, weight is of prime concern. For this reason, the vehicle designer must also consider the specific gravity of the material he selects.

Briefly described thus far have been the interrelationships of strength, toughness, stiffness and weight. Although no single test accurately reflects a harmonious blend of these material properties to guide a designer's selection, the calculated property of specific work-to-fracture is extremely helpful. This property of a particular material is obtained as the quotient of the material work-to-fracture property described previously, divided by the specific gravity of the material.

The Table I that follows implements the comparison of the above described material properties respective to several, commonly used, engineering materials.

By comparing the respective properties of mild steel and a hardened steel, it will be noted that although the strength of a given member may be improved by alloying and heat treating, the resulting gain will be at the expense of toughness (see Table I example 1; example 2, condition b; example 3, condition a). If rigidity is gained through geometric design with mild steel, toughness will be retained but at the cost of increased weight and complexity.

Note also from this Table I that both, mild steel and wood, as measured by specific work-to-fracture, are both high toughness materials.

Failure analysis of the strength and toughness properties obtained from prior art FRP composites reveals that frictional energy due to fiber pull-out from a confining matrix accounts for a majority of work-of-fracture absorption required of a structural failure.

TABLE I

| | Specific Gravity | Young's Modulus $\times 10^5$ N/mm$^2$ | Tensile Strength N/mm$^2$ | Failure Strain % | Work-to-Fracture $\times 10^4$ J/m$^2$ | Specific Work-to-Fracture $\times 10^4$ J/m$^2$ |
|---|---|---|---|---|---|---|
| Low Carbon Steel (U.S. spec. A1S1B1113) Low strength, free cutting steel [c = 0.1%; Si = Tr; Mn = 1.0%; s = 0.42%; P = 0.4%] | 7.80 | 2.06 | 383 | 33 | 68 | 8.7 |
| Plain Carbon Steel (U.S. spec. A1S1C1038) | 7.82 | 2.06 | | | | |
| (a) Normalized at 860° C. | 7.82 | 2.06 | 595 | 32 | 38 | 4.9 |
| (b) Oil quenched from 860° C.; Tempered at 205° C. | 7.82 | 2.06 | 772 | 19 | 5 | 0.6 |
| (c) Oil quenched from 860° C.; Tempered at 640° C. | 7.82 | 2.06 | 650 | 40 | 122 | 15.6 |
| Medium strength for general engineering applications [c = 0.4%; Si = 0.20%; Mn = 0.80%; S = 0.06%] | | | | | | |
| Alloy Steel (U.S. A1S14340) Tool steel, high strength applications | 7.86 | 2.08 | | | | |
| (a) Oil quenched from 830° C. | 7.86 | 2.08 | 1717 | 10 | 8.14 | 1.04 |
| (b) Oil quenched from 830° C.; Tempered at 200° C. | 7.86 | 2.08 | 1778 | 14 | 37 | 4.71 |
| (c) Oil quenched from 830° C.; Tempered at 600° C. [c = 0.4%; Si = 0.2%; Mn = 0.5%; Ni = 1.5%; Cr = 1.2%; Mo = 0.3%] | 7.86 | 2.08 | 1134 | 18 | 64 | 8.14 |
| Aluminum (ASTM B209/-1100) Annealed; low strength corrosion resistant applications | 2.7 | 0.68 | 80 | 30 | 37 | 13.7 |
| Aluminum Alloy (ASTM B209/3003) 1.2% Mn Annealed; castings, medium strength applications | 2.73 | 0.69 | 110 | 23 | 54 | 19.8 |
| Aluminum Alloy (ASTM B247/2018) [4% Cu; 0.8% Mg; 2% Ni] Solution treated and aged; High strength alloy for structural parts | 2.75 | 0.69 | 390 | 10 | 13.6 | 4.9 |
| Aluminum Alloy (ASTM B85SG100A) 10% Si; 0.5% Mg Casting alloy (engine parts) medium strength | 2.65 | 0.71 | 320 | 3.5 | 2.03 | 0.77 |
| Wood (Average) | 0.5 | 0.1* | 130* | 2* | 1** | 2** |

*Properties in the grain direction

TABLE I-continued

|  | Specific Gravity | Young's Modulus × $10^5$ N/mm² | Tensile Strength N/mm² | Failure Strain % | Work-to-Fracture × $10^4$ J/m² | Specific Work-to-Fracture × $10^4$ J/m² |
|---|---|---|---|---|---|---|
| **Crack propagation across the grain Glass Reinforced Plastics | | | | | | |
| Undirectional parallel fibers (50% volume fraction) | 1.8 | 0.37 | 500 | 1.6 | 1 | 0.6 |
| Two directional cloth (50% volume fraction) | 1.8 | 0.20 | 180 | 1.3 | 1 | 0.6 |

Very little of the failure energy is believed to be absorbed by either the fibers or the matrix, individually. Such observations perhaps explain why some prior art efforts to improve the work-to-fracture properties of FRP composites have focused on enhancement of the fiber pull-out mechanism of failure energy absorption.

Representative of prior art fiber pull-out enhancement techniques is the use of a debonding or wetting agent on polyaramid fibers prior to impregnation by a polyester or epoxy resin matrix. Another technique is the use of matrix resins which shrink from the composite fibers during cure.

British Pat. No. 1,331,431 issued Sept. 26, 1973, to J. G. Morley, teaches the use of convoluted or helically wound fiber drawn into a matrix bonded cylindrical bore to increase the extent of fiber/matrix frictional work.

Another British Patent to J. G. Morley, No. 1,333,711, issued Oct. 17, 1973, discloses the FRP composite fabrication method of weakly bonding a strong fiber to a sheath which is, respectively, strongly bonded to the matrix.

M. D. Campbell, in U.S. Pat. No. 4,265,981, cites the prior Morley techniques of fiber pull-out enhancement relative to Campbell's improvement of helically wrapping a relatively weak material about stronger fiber reinforcing elements prior to matrix bonding the wrapped fibers in a composite.

Proceeding from a different theory of failure energy absorption, J. E. Gordon and G. Jeronimidis published "Composites With High Work Of Fracture," Phil. Trans. R. Soc. Lond. A294, 545–550 (1980). Gordon and Jeronimidis analyzed the failure mechanics of natural wood to postulate the synergistic strength and toughness of that material as derived from a stress induced tensile buckling of helically wound hollow cellulose fiber. Under tensile stress, the helically wound cellulose cell walls initially collapse inwards, thereby severing the lignin matrix bond between cells. This facilitates a significant axial extension as the helical fibrils straighten and shear leading to the ultimate failure of the cell.

From these observations of natural wood failure, Gordon and Jeronimidis suggested an FRP composite of helically wound man-made fibrous elements such as glass or carbon into hollow tubes, the fibers within the tube walls and the tubes themselves being bonded together by a polymeric matrix; the tube cores remaining empty.

Gordon and Jeronimidis additionally discovered the optimum helix angle of 15° at which their hollow fibrous tubes should be wound. Within limits, larger angles may provide higher values of work-to-fracture but lead to unacceptable losses in strength and stiffness. On the other hand, smaller angles significantly reduce work-to-fracture for marginal improvements in strength and stiffness. Using such optimally wound tubes, composites yielding specific work-to-fracture values of $40 \times 10^4$ J/m² were obtained.

With no apparent recognition of the fundamental mechanics involved as proposed by Gordon and Jeronimidis, L. E. Trenner disclosed in U.S. Pat. No. 3,146,155 a method of fabricating flat, structural panels comprising a core layer of helically wound, open hollow coils formed of resin bonded glass fiber. The core layer was laminated between two facing sheets of resin bonded fiberglass matting.

Although Gordon and Jeronimidis have proven a theoretical basis for fabricating remarkably high strength, stiffness and work-of-fracture FRP composites, the necessity of helically winding massive quantities of resin saturated fibers into hollow tube elements for assembling such composites is economically unattractive at the present state-of-the-art. It is therefore, an object of the present invention to disclose and teach a method of synthesizing helically wound hollow tubes that is compatible with the present state-of-the-art mass production techniques.

Another object of the present invention is to teach a method of fabricating extremely strong, light and tough composite panels from both fibrous and homogeneous web or sheet base materials.

Another object of the present invention is to provide panel articles of light weight, high strength and toughness, and low manufacturing cost.

SUMMARY OF THE INVENTION

These and other objects of the invention are accomplished by exploiting the discovery that the remarkable strength and toughness properties of helically wound, hollow tube FRP composites may be closely approximated by familiar corrugated board structural systems having reinforcing fiber bonded to the corrugated medium at a 10 to 20 degres angle relative to the corrugated flute axis.

This basic invention principle may be developed for a wide range of material bases for application and economic flexibility. For example, a corrugated medium may be developed from a resin impregnated unidirectional fiber mat with the fiber direction skewed to the flute axis at the required angle. Such medium is then faced with two sheets of resin bonded fiber, each of one or more laminate thickness.

BRIEF DESCRIPTION OF THE DRAWING

Relative to the drawing wherein like or similar reference characters designate like or similar elements through out the several figures of the drawing:

FIG. 1 is a sectioned pictorial of a composite panel formed in the manner of the invention.

FIG. 2 is a plan of an invention panel illustrating the corrugated medium fiber orientation angle.

FIG. 3 is an end view of a compound embodiment of the invention.

FIG. 4 is a pictorial flute section from the compound embodiment of FIG. 3.

FIG. 5 is a pictorial of the Example II multiple medium embodiment of the invention.

FIG. 6 is a pictorial of the Example III multiple medium embodiment of the invention.

DESCRIPTION OF THE PREFERRED EMBODIMENTS

The corrugated panel embodiment of the invention illustrated by FIGS. 1 and 2 includes the three basic elements of most corrugated panel systems comprising two outer facing sheets 10 and 20 separated by a fluted medium sheet 30.

For a completely water repellent panel of maximum strength, the three sheets should be fabricated of synthetic fibers such as glass, graphite or polyaramid saturated with a thermosetting resin such as epoxy or polyester or a thermoplastic resin such as nylon or polypropylene.

The manufacturing technique may include partial curing of the resin system to impart a workable stiffness to the three sheets prior to a unitized final curing. The medium sheet 30 may be partially cured in the corrugated configuration by passage through a conventional heated corrugation nip.

Novel to the present invention, however, is the orientation of the fibers relative to the flute axes of the corrugated medium.

This novel orientation is illustrated by FIGS. 1 and 2 where the flute axis is shown by line 31. The path of an individual, representative fiber across the flute face is shown by line 32. The angle α measures the arc of divergence the fiber 32, makes relative to the flute axis 31. Nominally, the angle α should be 15° for the optimum compromise between toughness, strength and stiffness. In a corrugated system, however, α may range from 10° to 20°.

FIGS. 3 and 4 illustrate a matched pairing of two corrugated systems of the type represented by FIGS. 1 and 2. As shown by FIG. 3, the duplex system has a second corrugated medium 50 in phase aligned juxtaposition with the first medium 30. Medium 50 is identical to medium 30 in all respects except the angle α of the fiber orientation which is of opposite sense.

By following the full development of a single fiber line 32 in medium 30 from the ridge of the flute 30 crest into the valley, it will be noted that a corresponding fiber line 52 in medium 50 continues such line of development from the medium interface at face sheet 20 over the opposite flute crest of 50 back to the face sheet 20. A second fiber, not shown, in flute 30 having alignment with the valley tangent of fiber 52, continues a full period of helical development back to the crest of flute 30.

EXAMPLE I

As a first example of the invention, test samples of material were prepared to generally correspond to FIG. 1. 3M Corporation type 1003 unidirectional oriented continuous glass fiber-epoxy prepreg was laid in two parallel sheets providing a double laminate thickness for use as both liner (facing) and medium elements of the corrugated system.

Both faces of the medium element were covered with a thin release paper and partially cured to the undulating configuration through a conventional "B" flute corrugator at 320° F. roll temperature. Subsequently, the release paper was removed and the corrugated flute tips cleaned of release compound.

Ciba-Geigy epoxy resin 6010 with XU213 hardener was applied to the corrugated flute tips for lamination to and between the double ply liner elements. The assembly was positioned between release coated flat pressure platens and oven cured at 250° F.

Replicate test panels were prepared in the aforedescribed manner with different angular orientations α and β applied to the fiber relative to the flute axes. The angle β is the orientation given the fibers in both liner elements relative to the corrugated flute axes. The resulting panels had a specific gravity of 0.6–0.7 g/cc.

From these panels were cut 2 in. × 10 in. test samples for unnotched tensile tests on an Instron instrument. Each test sample was loaded in tension parallel with the flute axis. Table II shows the resulting work-to-fracture values as computed from the nonelastic area under the tensile stress-strain curves respective to the several medium and liner fiber orientations.

TABLE II

| Sample | Angle α | Angle β | Specific Work-to-Fracture $\times 10^4$ J/m$^2$ |
|---|---|---|---|
| A1 | 0° | 0° | 2.9 |
| A2 | +15° | −15° | 8.5 |
| A3 | +30° | −30° | 7.8 |
| B1 | 0° | 90° | 6.0 |
| B2 | +15° | −75° | 10.9 |
| B3 | +30° | −60° | 1.4 |

In both sample sets A and B, the greatest work-to-fracture occurred when the medium glass fiber orientation angle α was at 15° to the flute axis, as opposed to being at either 0° to 30° to the flute axis.

EXAMPLE II

A second test of the invention included a multiple medium panel such as illustrated by FIG. 5 having overall dimensions of 7 mm thick, 50 mm width and 100 mm long. Each of the seven medium elements, 30a through 30g, and the opposite liners 10 and 20 were fabricated from double laminates of unidirectional mats comprising 2 mm length, 7–8 micron diameter graphite fibers obtained from PERME, Waltham Abbey, England, and saturated with Ciba-Geigy 6010 epoxy resin with XU213 hardener. The fiber angle α in the medium element relative to the corrugation flute axes was 15°.

Each medium element was formed sequentially over staggered rows of rod formers 35, 1.5 mm diameter and cured at 350° F. The double laminate liners 10 and 20 were applied as described in Example I.

This panel had a porosity of 49% void space and a specific gravity of 0.61. Test samples of the panel were subjected to notched bend tests against both, edge and face planes, 90° of the flute axes.

For comparison, a sample of conventional, unidirectional solid graphite-epoxy composite and a sample of cross-grain oak wood were proximately subjected to the same notched bend test along with the invention samples. Table III reports the resultant date obtained from such test.

TABLE III

| SAMPLE | Density g/cc | Young's Modulus (E) GN/m² | Specific Stiffness (E/s.g.) GN/m² | Absolute Work-to-Fracture × 10⁴ J/m² | Specific Work-to-Fracture J/m² × 10⁴ |
|---|---|---|---|---|---|
| Invention face plane | 0.61 | 9.9 | 16.2 | 2 | 3.3 |
| Invention edge plane | 0.61 | 13.6 | 22.3 | 2 | 3.3 |
| Conventional graphite FRP composite | 1.6 | 140 | 87.5 | 0.1 | 0.06 |
| Oak Wood | 0.68 | 8–13 | 12–19 | 0.7 | 1.0 |

From this Table III data it may be seen that the invention composite is comparable to oak wood in density and stiffness (Young's Modulus), but greater than 3 times tougher. Oak is generally considered a relatively tough wood. Regarding the solid laminated composite, the invention was appreciably inferior in stiffness but the density was less than half and the toughness 50 times greater.

EXAMPLE III

As a third example of the invention, a panel was prepared with glass fiber reinforced kraft paper (Nashua #55 All-Purpose tape). The glass fiber was adhesively bonded between two kraft paper sheets and laid nominally in cross-machine paper direction although in fact, the fiber angle averaged approximately 15° to the cross-direction. The glass was distributed as 150 fibers per stand and approximately 2 strands per inch. Each composite sheet had a 35–36 lb./1000 ft.² paper basis weight.

Such tape was used to produce conventional "B" flute single-face corrugated board as both liner and medium. The medium was normally corrugated with flute axes in the cross-machine direction thereby providing the critical 15° angle of the glass reinforcing strands to the flute axes.

Five plys of the subject single-face board were assembled in the manner illustrated by FIG. 6 with polyvinyl acetate adhesive to form a ¾ in. thick panel.

Identical panels of unreinforced 33 lb./1000 ft.² kraft paper were prepared as control samples.

Both, control and invention, panels were subjected to shot tests comprising the gravity impact of a 19 oz. steel ball from a 10 ft. drop onto the face of a panel sample clamped securely about the four edges of a sample periphery.

The unreinforced control sample suffered an impact indentation of 7.5 mm whereas the invention panel was indented by only 4.3 mm.

EXAMPLE IV

Panels of the invention were prepared in the manner of Example III with 5 plies of single face board. In addition, the invention panels were oppositely faced with 24 oz./yd.² glass cloth, saturated with polyester resin.

For further comparison, test samples of ¾ in. CD plywood and ¾ in. expanded polystyrene foam received similar skin laminations of fiber glass. Additionally, a core section was prepared comprising multiple plies of "B" flute, double-faced, unreinforced corrugated board strips ¾ in. wide which were laminated face-to-face whereby the flute axes were perpendicular to the composite panel faces. The panel faces comprised the same fiberglass skin as applied to the invention and control panels.

The four test samples described above were subjected to the same ballistic impact of Example III to produce the data of Table IV.

TABLE IV

| Sample | Penetration, mm |
|---|---|
| Plywood | 1.0 |
| Invention | 1.5 |
| End fluted core | 5.7 |
| Polystyrene foam | 6.4 |

EXAMPLE V

As a final test of the invention, double-faced "B" fluted board was prepared with reinforcing as described for Example III. For such reinforced board, test samples of corrugated container boxes were prepared for top-to-bottom box compression load tests. This is the standard box stacking test which determines the vertical compression load under which a box collapses.

A comparable basis weight, unreinforced container collapses under 350 lbs. of compression whereas the invention reinforced container collapsed under 475 lbs. compression.

Standard Mullen burst tests on the above container walls determined a strength of 150 lbs./in.² for the unreinforced sample and 174 lbs./in.² for the invention reinforced sample.

Due to the absolute cost of fiber and resin, corrugated medium panels fabricated pursuant to the teachings hereof entirely of those materials are expensive but not so much as for helical tube composites. The economics of many vehicular and portable shelter applications easily justify such costs in return for the relative toughness, rigidity and weight savings available from the invention as a FRP composite.

On the opposite end of the economic and strength spectrum, reinforced corrugated paper systems fabricated according to our teachings may be greatly enhanced by only negligible quantities of thinly dispersed but properly oriented reinforcing fiber.

As a mid-range product, the invention also comprehends a paper based corrugated composite in which the basic reinforced web elements are overlaid with an extruded thermoplastic film such as polypropylene or polyethylene. Also comprehended are blended petroleum saturating and coating waxes as are applied by processes such as Meridex and curtain coating. In particular, continuous fiber reinforcing strands may be laid transversely (approximately 15° from CD) across a traveling paper web immediately prior to a thermoplastic film extruding die which overcoats the strands and the web thereby simultaneously waterproofing the paper and securing the reinforcing strands. Such water resistive, reinforced web is subsequently fabricated into a corrugated panel structure as described herein.

Another technique for integrating reinforcing fiber with a paper web may be to lay the fiber at the proper orientation angle onto a wet, incompletely formed web while yet on the paper machine forming table or proximate of the first web press so as to attach the reinforcing fiber by immersion within the hydrogen bonded cellulose structure of the web.

A similar principle is involved by laminating the reinforcing fiber between two separately formed but relatively wet webs which are subsequently bonded together by calender presses.

A heretofore unstated advantage of such structural systems as disclosed herein relates to their ability to hold fixings and fasteners such as staples, nails or rivets. These advantages arise from the internal voids which accommodate the volumetric deformation necessitated necessitated by the fixing, and the cross ply of fibers which generate high frictional forces when displaced.

It is to be understood, that references to an approximate angle of 15° at which the reinforcing fiber lays relative to corrugated flute axes encompasses the angular span of 10° to 20°. Depending on the precise details of the application, it may be desirable to obtain a different compromise between stiffness and toughness which can be achieved by varying the orientation angles in both, medium and facing sheets between extreme limits of 5° to 30°.

The basic structural principles disclosed hereby may also be applied to other, known, material combination systems such as boron or silicon carbide fiber immersed in a malleable metal matrix such as copper, brass, aluminum or iron.

Still another set of material composite systems to which these basic structural principles may be applied encompasses fibers such as glass, polypropylene or steel wire set in a cementitious matrix.

Having fully described our invention:
We claim:

1. A composite structural material assembly comprising two planar face sheets separated by at least one, corrugated sheet having an indulating surface, said face sheets being attached to said corrugated sheet along respective corrugated flute ridge lines, the improvement comprising oriented structural fiber integrally attached to said corrugated sheet so as to follow the undulating surface of said corrugated sheet at an approximate orientation angle of 15° with said ridge lines.

2. An article as described by claim 1 wherein said corrugated sheet is a resin impregnated oriented glass fiber mat having corrugation flutes formed therein at approximately 15° of said fiber orientation.

3. An article as described by claim 1 wherein said corrugated sheet comprises a corrugated kraft paper substrate having oriented, structural reinforcement fibers attached thereto.

4. An article as described by claim 3 wherein said fiber reinforced corrugated sheet is coated with a moisture impermeable substance.

5. An article as described by claim 3 wherein said fiber reinforced corrugated sheet is coated with an extruded, thermoplastic film.

6. An article as described by claim 1 comprising a second corrugated sheet also having structural fibers integrally attached thereto so as to follow the undulating surface thereof along an orientation of approximately 15% to corrugation flute ridge lines, said second corrugated sheet being attached to the opposite side of one face sheet from the first corrugated sheet, said first and second corrugated sheet ridge lines being attached in aligned juxtaposition to respectively opposite faces of said one face sheet with the 15° fiber orientation of said first corrugated sheet being oppositely disposed from the 15° fiber orientation of said second corrugated sheet.

7. An article as described by claim 1 comprising additional oriented structural fiber integrally attached to and in the plane of said face sheet at an approximate orientation angle of 15° with said flute ridge lines in the opposite angular sense from the orientation of said corrugated sheet fiber.

8. An article as described by claim 1 comprising the parallel flute lamination of at least two fiber attached corrugated sheets separated by one face sheet.

9. An article as described by claim 8 wherein the attached fiber of adjacent corrugated sheets has opposite orientation angles relative to respective flute ridge lines.

10. An article as described by claim 8 wherein the attached fiber of adjacent corrugated sheets has the same orientation angle relative to respective flute ridge lines.

11. An article as described by claim 10 comprising additional oriented structural fiber attached to and in the plane of said one face sheet at an approximate orientation angle of 15° with said flute ridge lines in the opposite angular sense from the orientation of said corrugated sheet fiber.

12. A composite structural material assembly comprising two planar face sheets separated by at least one undulating surface corrugated medium, said face sheets being attached to said medium along respective outside planes of corrugated flute ridges, the improvement comprising oriented structural fiber integrally attached to said medium so as to follow the undulating surface of said corrugated medium at an approximate orientation of 15° to said respective flute axes.

13. An article as described by claim 12 wherein said medium comprises a pair of fiber attached corrugated sheets, each sheet of said pair having structural fiber attached therewith at said orientation angle, said angles being oppositely oriented relative to corrugated flute axes and said sheet pair being attached together along respective external flute ridge lines.

14. A method of fabricating a structural composite comprising the steps of corrugating an oriented fiber containing sheet to form parallel, elongated flutes extending approximately 15° from the oriented fiber direction and bonding a planar liner sheet to flute ridges on at least one face of said corrugated sheet.

15. A corrugated paperboard container comprising an undulating surface, corrugated medium element laminated to a planar facing sheet element along corrugation flute ridge lines, wherein structural reinforcing fibers are integrally attached to said corrugated medium element so as to follow the undulating surface thereof with a longitudinal orientation of said fibers disposed at approximately 15° from corrugated medium flute axes.

16. A corrugated paperboard container as described by claim 15 wherein structural reinforcing fibers are integrally attached to and in the plane of said facing sheet associated with said medium element.

17. A corrugated paperboard container as described by claim 16 wherein said facing sheet fiber is oriented at an approximate orientation angle of 15° with said flute axes in the opposite angular sense from the orientation of said medium attached fiber.

* * * * *